Nov. 26, 1968    R. E. TEALE    3,412,534
CROP HARVESTER
Filed May 2, 1966    3 Sheets-Sheet 3
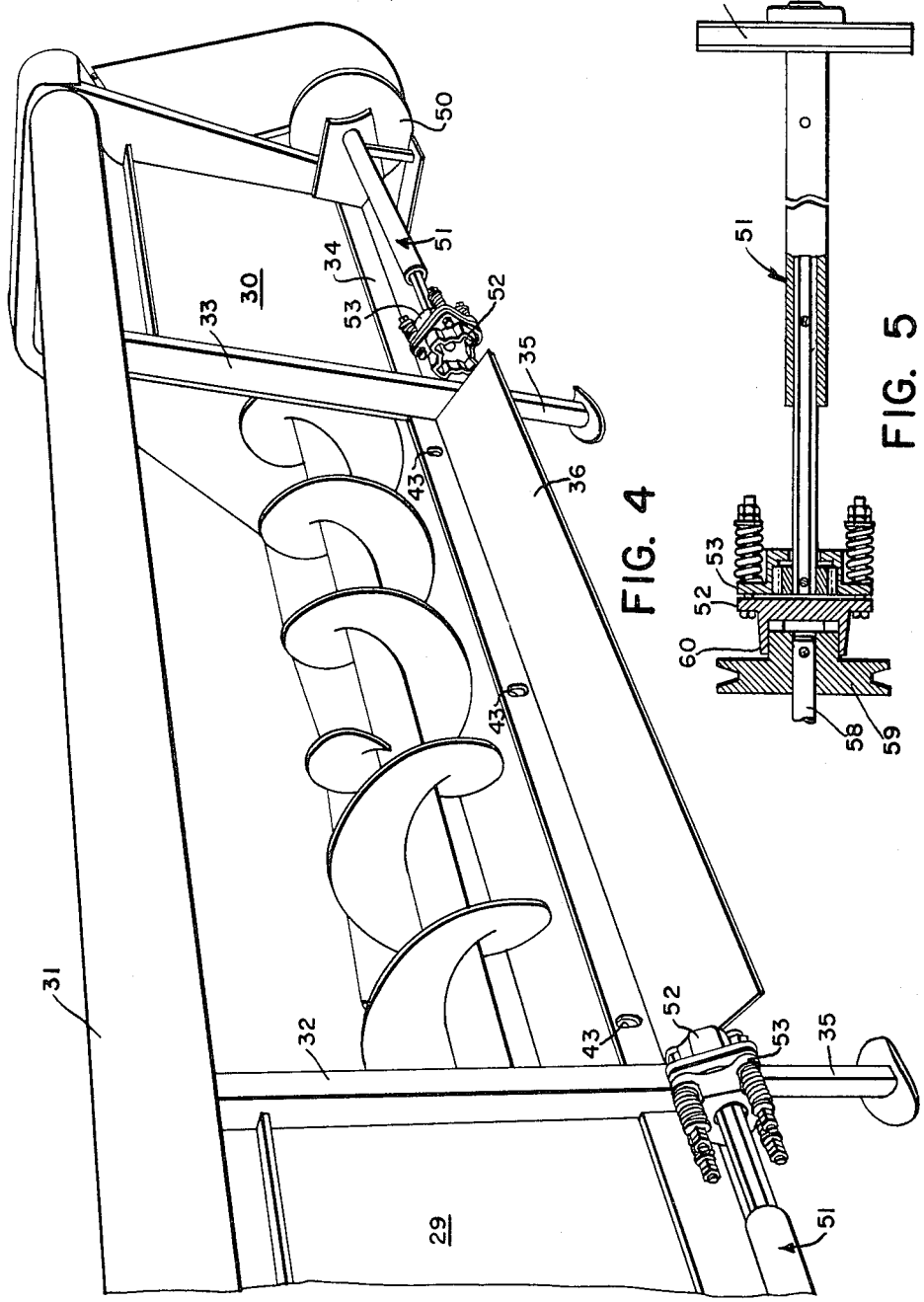
INVENTOR.
ROBERT E. TEALE
BY William A. Murray
ATTORNEY United States Patent Office 3,412,534
Patented Nov. 26, 1968

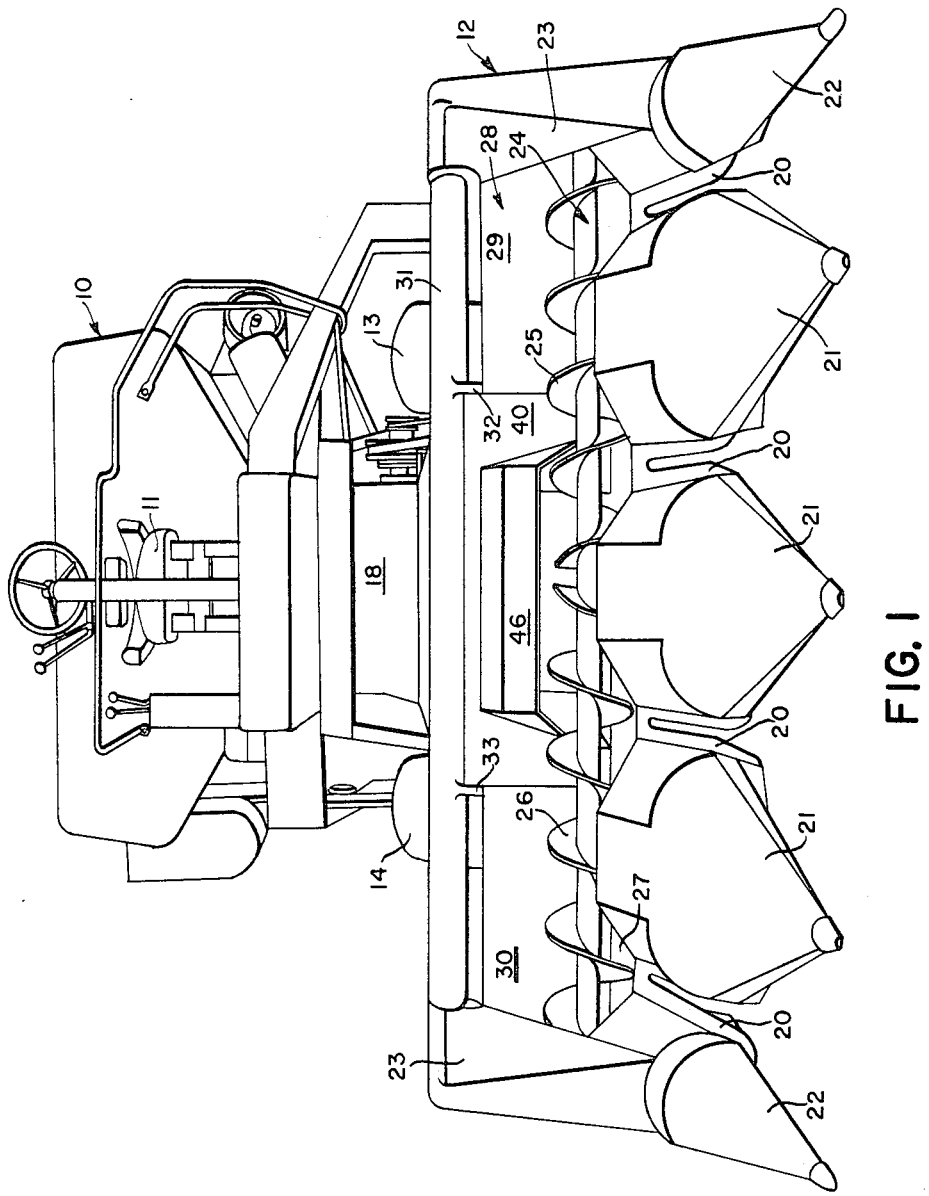

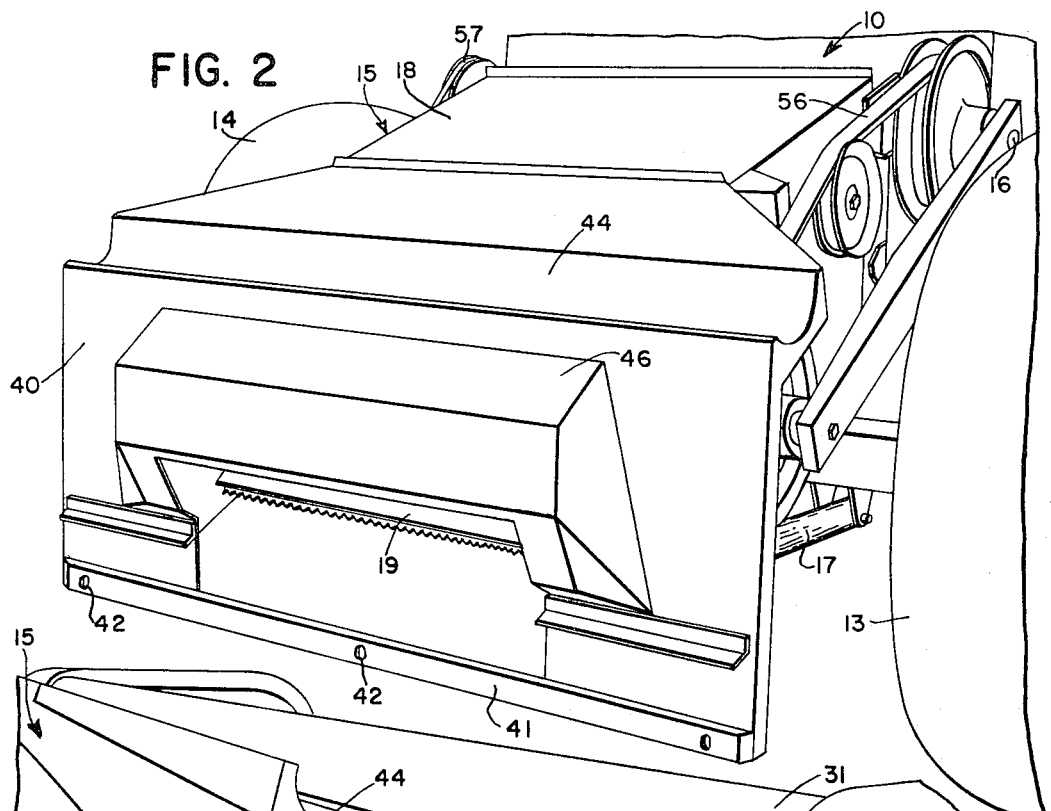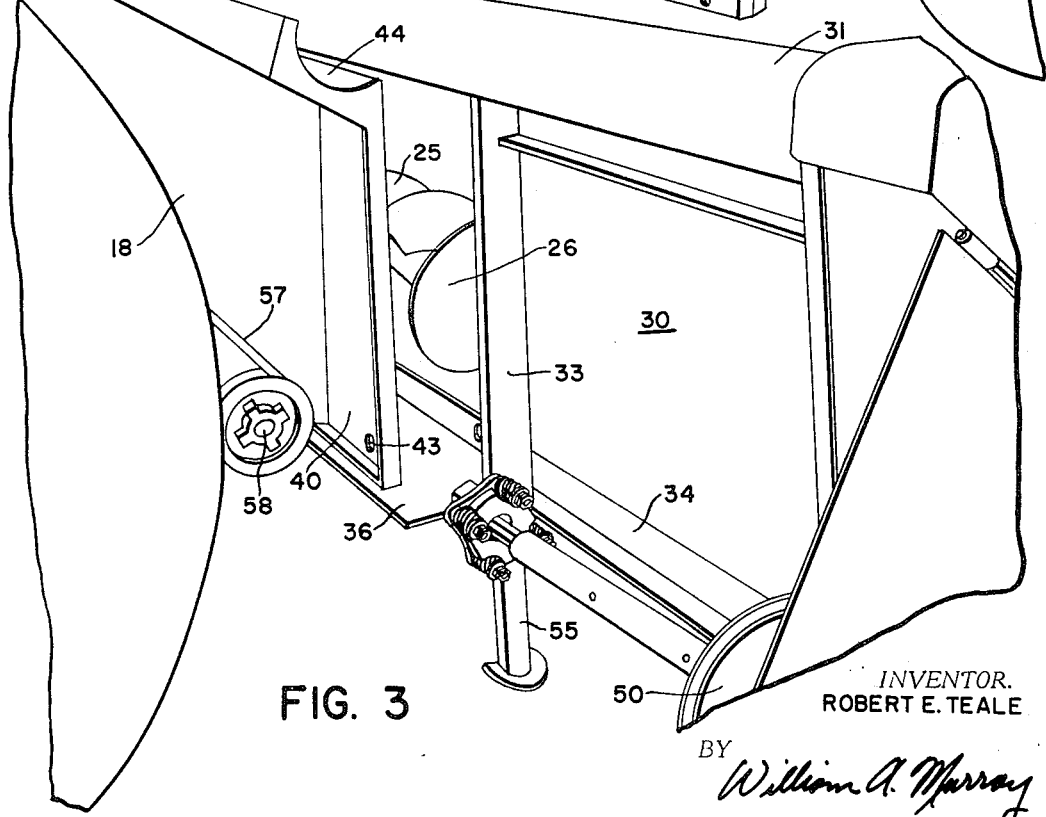

3,412,534
CROP HARVESTER
Robert Edward Teale, East Moline, Ill., assignor to Deere & Company, Moline, Ill., a corporation of Delaware
Filed May 2, 1966, Ser. No. 546,773
5 Claims. (Cl. 56—15)

This invention relates to a crop harvester and more particularly to a crop harvester that has a main mobile crop treating unit with a feeder housing structure projecting forwardly therefrom and downwardly to a crop harvesting unit. Still more particularly this invention relates to the connecting structure between the feeder housing structure and the crop harvester housing structure.

It is the primary object of the present invention to provide a connecting structure between the feeder housing and the harvester that is quickly attachable and detachable. Specifically it is the object of the present invention to provide a crop harvester having a series of forwardly directed harvesting units or mechanisms that feeds the harvested crop rearwardly into a transverse auger that operates to feed the material centrally to a forward portion of a feeder housing. The crop harvester includes housing structure having an auger trough beneath the transverse auger and an upright transverse wall rearwardly of the auger and extending upwardly from the auger trough. The upright wall has a central horizontally elongated opening for accommodating the lower open end of the feeder housing. Extending across the upper edge of the transverse wall is a transverse horizontal beam or tube with a rounded underside. The feeder housing is provided with a plate at its lower forward end that is adapted to seat in and to close the central opening of the rear upright wall of the harvester. A transverse upwardly opening structural member is fixed to the plate along its transverse upper edge and is adapted to engage and journal on the rounded underside of the transverse beam of the harvester. The crop treating unit is further provided with hydraulic means that is adapted to raise and lower the feeder housing. Consequently as the feeder housing is raised and lowered it will create a jack-knife relation between the forward harvesting unit and the feeder structure. By suitable adjustment of the hydraulic units the plate may be moved into alignment with the transverse wall about an upper transverse pivotal connection defined in part by the rounded underside of the beam and the upwardly opening transverse structural element on the plate. Upon the plate being in alignment with the wall, there is provided suitable connecting means to retain the alignment.

Other objects and advantages will become apparent to those skilled in the art as the nature of the invention is better understood from the following description and as shown in the accompanying drawings.

FIG. 1 is a front view of the entire crop harvesting and treating unit.

FIG. 2 is a left side and front perspective view of the feeder structure.

FIG. 3 is a right side perspective view a portion of the harvester and a portion of the feeder housing structure at a position in which coupling between the two structures is about to occur.

FIG. 4 is a rear and side perspective view of the central portion of the harvester structure.

FIG. 5 is a rear view of one of the drive mechanisms on the harvesting unit with part thereof shown in section for purposes of showing internal mechanism.

In the particular illustration presently to be described, the invention is shown in combination with a conventional type combine and a corn head. The combine is composed of a main crop treating unit 10, having a forwardly positioned operator's station 11 that slightly overlies, for viewing purposes, a forwardly positioned corn harvester 12. The combine or crop treating unit 10 is supported for mobility on rear wheels, not shown, and front transversely spaced traction wheels 13, 14. A feeder structure 15 extends downwardly from an upper rear end opening into the forward portion of the crop treating unit 10 to a lower forward open end positioned to receive crops from the corn harvester 12. The feeder structure 15 is adapted to move vertically about a rear trunnion as indicated by the trunnion shaft 16. Hydraulic cylinders 17 extend between the framework of the crop treating unit and the forward lower end of the feeder structure 15 and may be adjusted from the operator's station to raise and lower the feeder structure 15. The feeder structure 15 is composed of a feeder housing 18 that is rectangular in cross section and contains therin fore-and-aft conveying mechanism, shown only partially at 19, that feeds the crops from the harvesting unit 12 into the crop treating unit 10.

The harvesting unit 12 is composed of four corn harvesting mechanisms 20 that are spaced apart transversely and separated by suitable stylings 21 so that the harvester 12 may harvest four rows of corn as it advances. The harvester 12 includes further housing, besides the stylings 21, that is composed of the outboard gatherers 22 and outer fore-and-aft extending upright walls 23. The harvesting mechanisms 20 feed the harvested crop rearwardly to a transverse auger structure 24 that has a pair of spiral flightings 25, 26, of opposite hand, which operates to move the crop inwardly and centrally of the harvesting unit 12. The housing for the corn harvester 12 also includes an auger trough 27 for the auger 24 and a rear upright transverse wall structure 28 composed of outer upright panels 29, 30 that are separated at the center of the harvester 12 to provide a central horizontally elongated opening that accommodates the lower open end of the feeder structure 15. The upright wall structure 28 further includes a main frame composed of an upper transverse horizontal main beam or tube 31 that extends completely across the upper edge of the wall structure 28 and defines in part the upper edge of the opening between the panels 29, 30. The central opening is further defined by a pair of upright structural members 32, 33 and a horizontal lower angle iron member 34 that extends completely across the harvester. Retractable supporting stands 35 are provided to be recessed in the beams 32, 33 and extended to support the harvester on the ground. The upper transverse beam 31 is round in cross section. A flexible panel 36 extends rearwardly from the rear lower edge of the angle iron member 34.

The feeder structure 15 has an upright transverse plate 40 at its forward lower end that projects outwardly from the housing 18. As is clearly apparent, the plate 40 is adapted to fit into the opening in the harvester defined by the upright beams 32, 33 and the upper and lower transverse horizontal beams 31, 34. A metal reinforcing strap 41 is fixed to and extends across the lower edge of the plate 40. Bolt openings 42 are provided in the strap 41. Similar bolt openings 43 are provided in the vertical flange of the angle iron member 34. Extending rearwardly from the upper edge of the plate 40 is an upwardly opening partially symmetrical-shaped structural member 44 that is adapted to engage the underside of the transverse beam 31. When so engaged the beam 31 journals in the structural member 44 to thereby provide a transverse pivotal connection between the harvester 12 and the feeder structure 15.

In mounting the harvester 12 on the feeder structure 15, the cylinders 17 are operated to lower the feeder housing 18 to a level beneath the upper transverse beam 31. The treating unit 10 is then driven forwardly until the transverse structural means 44 is directly beneath the beam 31. The hydraulic cylinders 17 are then extended to cause the upwardly opening structural member to engage the rounded underside of the beam 31 to thereby cause a jackknife action between the plate 40 and the wall 28 until the plate is in transverse alignment with the wall 28. At this time the openings 42 will be in registry with the openings 43 and bolts may be inserted therethrough to fix the plate 40 in its transverse alignment with the wall 28.

A hood 46 is fixed to and projects forwardly of the plate 40. The hood 46 is generally a forward continuation of the housing 18 that overlies partially the central portion of the auger 24 and operates to guide material into the feeder housing 18 and to the conveying means 19. Drive means for the harvester is composed in part of a pair of V-belt drives, one of which is shown at 50, on opposite ends of the harvester. The drives 50 are driven by a pair of transversely extending main drive shaft means that terminate in a pair of coupling parts 52. Overrunning clutches 53 are provided with the coupling parts 52.

A pair of V-belt drives 56, 57 is driven by the main power source, not shown, of the combine 10 and operates to drive the conveying mechanism 19 and a transverse shaft 58 at the lower end of the housing 18. The shaft 58 carries a pulley 59 that is a part of the V-belt drive 57. Integral with the pulley 59 is a coupling part 60 that is adapted for alignment with the coupling part 52 on the right-hand side of the harvester. A similar coupling part is supported on the left end of the shaft 58 and is adapted for connection to the coupling part 52 on the left-hand side of the harvester. The coupling parts 52, 60 will be aligned upon the plate 40 being adjusted for transverse alignment with the upright wall 28. The transverse drive shafts 51 are of the telescoping variety and the coupling 52 may be withdrawn for disengagement with the coupling part 60 or, when being attached, the shaft 51 may be extended to create engagement between the coupling parts 52, 60.

While only one form of the invention has been shown, it should be recognized that other forms and variations will occur to those skilled in the art. Therefore while the preferred form has been shown in concised and detailed manner for the purpose of clearly explaining the principles of the invention, it should be understood that there is no intention to limit or narrow the invention beyond the broad aspects set forth in the appended claims.

What is claimed is:

1. In combination, a crop treating unit, a forwardly directed feeding structure extending downwardly from an upper rear end opening into the crop treating unit to a lower forward open end and having a trunnion connection to the treating unit whereby the structure may move vertically about its rear end; a harvester forwardly of the feeding structure having forwardly directed harvesting mechanism feeding rearwardly to a transverse auger, and having a housing therefor including a trough for the auger and a transverse upright wall rearwardly of the auger with a central horizontally elongated opening therein for accommodating the lower open end of the feeding structure; a transverse horizontal beam having a rounded underside extending across the housing and defining the upper portion of the opening; an upright transverse plate fixed to and extending outwardly of the forward portion of the feeding structure and adapted to seat in and to close the opening of the wall; a transverse upwardly opening structural means fixed to the plate along its transverse upper edge and adapted to engage and journal on the rounded underside of the transverse beam to thereby provide a transverse pivotal connection between the upper portion of the vertical wall and the upper portion of the plate; power means for raising and lowering the feeder structure to thereby provide a jackknife action between the plate and wall about the pivotal connection and to move the plate in and out of alignment with the wall; and means for fixing the plate to the harvester upon the plate and wall being in alignment.

2. In combination, a crop treating unit, a forwardly directed feeding structure extending downwardly from an upper rear end opening into the crop treating unit to a lower forward open end and having a trunnion connection to the treating unit whereby the structure may move vertically about its rear end; a harvester forwardly of the feeding structure having forward harvesting mechanism feeding rearwardly to a transverse auger, and having a housing therefor including a trough for the auger and a transverse upright wall rearwardly of the auger with a central horizontally elongated opening therein for accommodating the lower open end of the feeding structure; a transverse pivotal connection between the upper portion of the vertical wall and the upper portion of the plate including a transverse beam having an outer rounded surface on one of the upper portions and vertically opening complementary structural element means on the other upper portion adapted to engage and journal on the surface of the beam; power means for raising and lowering the feeder structure to thereby provide a jackknife action between the plate and wall about the pivotal connection and to move the plate in and out of planetary alignment with the wall; and means for fixing the plate to the harvester upon the plate and wall being in the desired alignment.

3. The structure as set forth in claim 2 further characterized by drive means on the harvester including a transverse horizontal drive shaft rearwardly of the rear wall having an inner end adjacent the feeder housing with a drive coupling on its inner end; and a drive on the feeder structure terminating in a coupling on its lower end, the coupling on the drive shaft and on the lower end of the feeder structure being in transverse alignment and interconnectible upon the plate being in alignment with the upright wall.

4. The structure as set forth in claim 2 further characterized by the feeder structure having a fore-and-aft extending feeder housing with its lower end extending through the plate and terminating in a hood that overlies the central portion of the transverse auger.

5. The structure as set forth in claim 4 characterized by the auger being composed of spiral flighting of opposite hands extending from a central juncture beneath the hood.

References Cited

UNITED STATES PATENTS

| | | | |
|---|---|---|---|
| 3,270,489 | 9/1966 | Rohweder | 56—21 |
| 3,324,637 | 6/1967 | Ashton et al. | 56—21 |

ROBERT E. BAGWILL, *Primary Examiner.*